United States Patent [19]

Imazaike

[11] 3,874,752

[45] Apr. 1, 1975

[54] SYNTHETIC RESIN-MADE BEARING

[76] Inventor: Yasutaka Imazaike, 22 Tanabe Nishino-cho 8-chome, Higashi-Sumiyoshi-ku, Osaka, Japan

[22] Filed: Jan. 18, 1974

[21] Appl. No.: 434,369

[52] U.S. Cl. .............................................. 308/238
[51] Int. Cl. .......................................... F16c 33/20
[58] Field of Search ................ 308/238, 237, 15–34, 308/DIG. 7; 226/194

[56] References Cited
UNITED STATES PATENTS

| | | | |
|---|---|---|---|
| 3,415,155 | 12/1968 | Riddell et al. | 308/238 X |
| 3,539,234 | 11/1970 | Rapata | 308/238 |
| 3,771,846 | 11/1973 | Bass et al. | 308/238 |

FOREIGN PATENTS OR APPLICATIONS

| 1,808,533 | 11/1968 | Germany | 308/15 |
|---|---|---|---|

Primary Examiner—M. Henson Wood, Jr.
Assistant Examiner—Gene A. Church
Attorney, Agent, or Firm—Frank J. Jordan

[57] ABSTRACT

A bearing made of a synthetic resin and adapted for use with small precision instruments and the like includes a bearing body having an external flange and protrusions axially spaced from the flange. The bearing body is received in a base plate having an opening and notches corresponding to the spacing and configuration of the protrusions in the bearing body. Cooperable securing means are provided on the protrusions and the base plate whereby upon insertion of the bearing body and protrusions into the base plate opening and the notches respectively and subsequent rotation of the bearing body, the securing means secure the bearing body to the base plate as the latter is engaged between the protrusions and the flange.

8 Claims, 7 Drawing Figures

3,874,752

SYNTHETIC RESIN-MADE BEARING

BACKGROUND OF THE INVENTION

The present invention relates to a bearing made of synthetic resin suitable for receiving a relatively small shaft used for smaller-sized precision instruments such as a miniature motor or a watch.

In a known method of forming a bearing for such smaller-sized precision instruments, a hole is made in a base plate and formed into a predetermined shape while, at the same time, synthetic resin is applied and hardened along the periphery of the hole to thereby form a bearing body. However, if a base and a bearing body are thus formed into a single unit relationship, there is a risk that an eccentric or deformed bearing may be obtained since the base plate and the bearing body differ in their material quality and therefore, in their thermal contraction coefficients. Such known method is therefore inappropriate for making a bearing for smaller-sized precision instruments.

Accordingly, an object of the present invention is to overcome the disadvantages of known prior art arrangements and to provide for easy production of a bearing by forming a bearing body separately from a base plate.

Still another object of the present invention is to provide a bearing in which is bearing body can easily and firmly be fixed on the base plate and also can easily be replaced, as desired, with new ones.

A further object of the present invention is to provide an economical bearing of high performance. Other features which are considered characteristic of the invention are set forth in the appended claims.

Although the invention is illustrated and described in relationship to specific embodiments, it is nevertheless not intended to be limited to the details shown, since various modifications and structural changes may be made therein without department from the spirit of the invention and within the scope and range of equivalents of the claims.

In the present invention according to one embodiment thereof, a synthetic resin-made bearing body having a shaft hole in its central portion is provided with a flange member and diametrically opposed protrusions or lugs in its peripheral surface. The protrusions are suitably spaced vertically from the flange member and have projections extending from their insides while, either one or both of a bearing body turning means such as a hexagon nut and a second bearing body turning means in the form of a groove formed in its end surface for receiving a screw-driver are provided in one end of the bearing body successive to the above mentioned flange member. On the other hand, a bearing body receiving hole is made in a desired position of a base plate. This hole is provided with notches in suitable positions of its peripheral portion so that they correspond to the positions and shape of the above mentioned convex protrusions in the bearing body. The base plate is also provided with depressions or holes engaged by the above mentioned projections on the protrusions. With such an arrangement, the protrusions of the bearing body are fitted into the notches of the base plate and thereafter, the projections on the protrusions are engaged in the depressions in the base plate by turning the bearing body turning means, whereby the bearing body can be fixed or secured, with the base plate resiliently pressed between the protrusions and the flange member. These are characteristics of the bearing of the present invention.

SUMMARY OF THE INVENTION

A bearing for small size precision instruments and the like includes a bearing body having a cylindrical opening for a shaft. The bearing body has an external flange and external protrusions axially spaced from the flange. The bearing body is mounted on a base plate which has an opening in which the bearing body is received. The base plate has notches corresponding to the spacing and configuration of the projections on the bearing body. Cooperable securing means are provided on the protrusions and the base plate operable to secure the bearing body in position on the base plate upon insertion of the bearing body and protrusions into the base plate opening and base plate notches respectively and upon subsequent rotation of the bearing body until the securing means is engaged, whereby the bearing body is secured to the base plate as the later is engaged between the protrusions and the flange.

DESCRIPTION OF THE PREFERRED EMBODIMENTS

Figure 1:
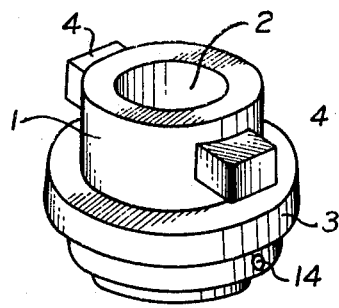
FIG. 1 is an enlarged perspective view of a bearing body according to one embodiment of the invention.
Figure 2:
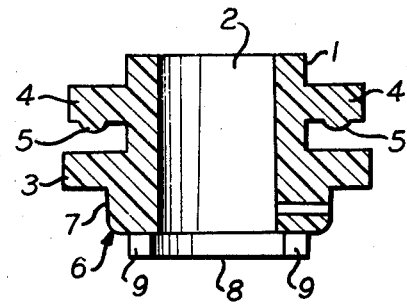
FIG. 2 is a longitudinal sectional view of the bearing body shown in FIG. 1.
Figure 3:
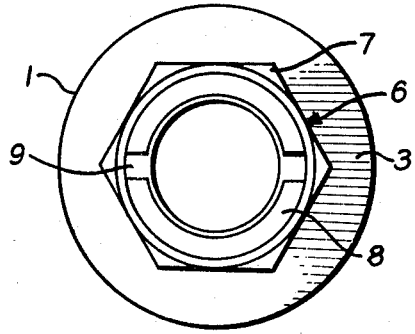
FIG. 3 is a bottom view of the bearing body shown in FIG. 1.
Figure 4:
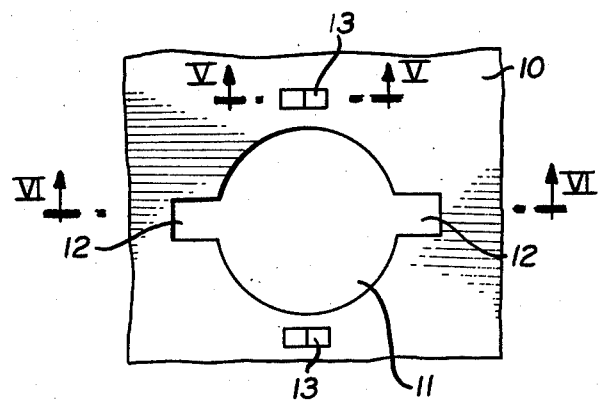
FIG. 4 is an enlarged plan view of a principal portion of a base plate.
Figure 5:
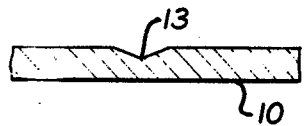
FIG. 5 is a sectional view taken on the line V—V of FIG. 4.
Figure 6:
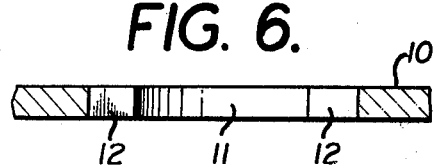
FIG. 6 is a sectional view taken on the line VI—VI of FIG. 4.
Figure 8:
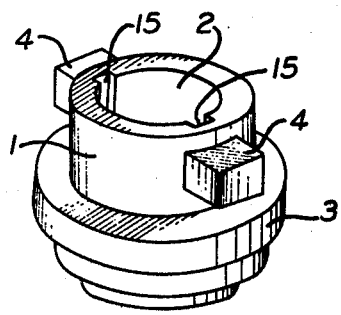
FIG. 8 is an enlarged perspective view of a bearing body according to an alternative embodiment.
Figure 9:
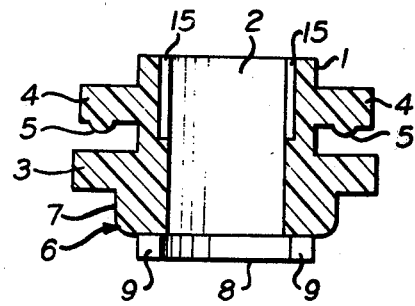
FIG. 9 is a longitudinal sectional view of a bearing body shown in FIG. 8.
Figure 7:
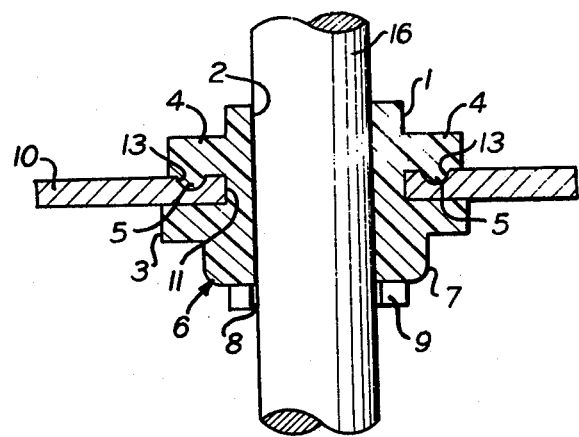
FIG. 7 is an enlarged longitudinal sectional view showing the bearing body in its assembled state on the base plate.

Referring to the drawings, 1 is a bearing body and 2 is a shaft hole. 3 is a flange member and 4, 4 are protrusions having projections. 5, 5. In general, the bearing body 1 is molded of formaldehyde resin having desirable elasticity, high wear resistant properties and great mechanical (physical) strength. However, any kind of synthetic resin is acceptable as a material from which the bearing body may be made if it has the desirable elasticity, is highly wear-resistant and has great mechanical (physical) strength. The shaft hole 2 may be tapered inwardly or outwardly, may be formed axially stepwise so as to have different diameters or may only be opened to one end of the bearing body 1 although in the figures the shaft hole 2 has the same constant diameter axially of the bearing body 1. The projections 5, 5 have a generally semispheric configuration. However, their shape does not need to be a precise semisphere and can be made of other configurations such as a cone for example. 6 is a bearing body turning means provided in one end of the bearing body 1 successive to the flange member 3, and consists of an angular nut portion 7 which has a smaller diameter than the flange member 3 and is angled at its periphery such as to form a hexagonal nut and an annular portion 8 which has a smaller diameter than said angular nut portion 7 annularly protrudes therefrom. The annular portion 8 is diametrally provided with a screw-driver slot 9 in its axial surface. When the bearing body 1 is fixed to or detached from the base plate described hereinafter, the bearing body turning means 6 thus formed is turned by means of hand tools to change a position of said bearing body 1. For example, a spanner, a wrench or the like and a screw driver or the like are respectively applied to the angular nut portion 7 and the screw driver hole 9 of the annular portion 8 to effect the turning movement of the bearing body 1. It is, however, to be noted that the bearing body turning means 6 does not always need to be provided with both the angular nut portion 7 and the annular portion 8. For example, alternatively the turning means 6 may be arranged to have the screw-driver slot 9 formed directly on the end surface of the angular nut portion 7 or it can be arranged to have only the angular nut portion and or only the screw-driver slot. 10 is a base plate, and 11 is a bearing body receiving hole made in a suitable position of the base plate 10. The bearing body receiving hole 11 is substantially equal in its diameter to the outside diameter of the bearing body 1 and is provided with diametrically opposed notches 12, 12 in its periphery arranged so that they correspond to the protrusions 4, 4 on the bearing body 1. The hole 11 which fits the contour of the bearing body 1 and the protrusions 4, 4 is thus made on the base plate 10. 13, 13 are depressions made in the base plate 10 so as to correspond to the inside projections 5, 5 on the above mentioned protrusions 4, 4. These depressions 13, 13 are formed with a reverse-triangle configuration as shown in FIGS. 4 and 5 to thereby allow, to the best of their ability, an error in precision of circumferential positions of the depressions 13, 13 and the projections 5, 5. This facilitates fitting of the depressions 13, 13 and projections 5, 5. Alternatively, however, the depressions 13, 13 may be changed to other configurations such as semispherical hollows or holes. In FIGS. 1 and 2, 14 is a grease inlet which is provided in the bearing body only when required. Alternatively, this grease inlet 14 may be replaced with greasing grooves 15, 15. In FIG. 7 16 shows a rotational shaft.

With such an arrangement, the protrusions 4, 4 are inserted first into the notches 12, 12 to thereby fit the bearing body 1 into the bearing body receiving hole 11. Thereafter, the bearing body is turned through 90° and as a result, the projections 5, 5 provided in the protrusions 4, 4 are fitted into the depressions of the base plate 10. The bearing body 1 is thus detachably mounted to the base plate. In order to turn the bearing body 1, the bearing body turning means 6 formed in one end of the bearing body is used. That is to say, a spanner or a wrench or the like is applied to the angular nut portion 7 of the bearing body, or a screw driver or the like is inserted into the screw-driver hole 9 of the annular portion 8, thereby allowing rotational movement of the bearing body. It will therefore be understood that an easier, more speedy and more stable turning operation can thus be achieved on the bearing body than by hand.

In the present invention, since the bearing body and the base plate are separately formed, they can easily be assembled into a bearing while, at the same time, the bearing body can firmly be fixed or secured on the base plate with high accuracy and there is no risk that unexpected eccentricity or distortion is made on the bearing thus obtained, by correlation of the facts that the bearing body is fitted into the bearing body receiving hole of the base plate and the base plate is held between the protrusions and the flange member and moreover, the projections provided on the protrusions are engaged with the depressions made in the base plate. This allows effective use of the bearing of the present invention in watches and other precision instruments. In addition, when the bearing body has been abraded, it can easily be replaced by turning it through 90°, removing the projections from the depressions and detaching the protrusions from the notches. This also is one of the superior effects of the present invention. In particular, the present invention provides an advantage that easier, more speedy and more stable fixation and removal can be obtained on this kind of smaller-sized bearing body which is hard to operate by hand, since the bearing body is formed with either or both of the bearing body turning means angled in its periphery such as a hexagon nut and the second turning means grooved in its end surface for the screw-driver slot to thereby allow effective use of hand tools for fixation and securement of the bearing body.

The present invention may be embodied in other specific forms without departing from the spirit or essential characteristics thereof. The presently disclosed embodiments are therefore to be considered in all respects as illustrative and not restrictive, the scope of the invention being indicated by the appended claim rather than the foregoing description, and all changes which come within the meaning and range of eqvvalency of the claim are therefore intended to be embraced therein.

What is claimed is:

1. A bearing for small size precision instruments and the like comprising a bearing body having a cylinder opening for a shaft, a flange or said bearing body, protrusions extending outwardly from said bearing body and axially spaced from said flange, a base plate having an opening in which said bearing body is received, said base plate having means defining notches corresponding to the spacing and configuration of said protrusions on said bearing body, and cooperable securing means on said protrusions and said base plate operable to secure said bearing body in position on said base plate upon insertion of said bearing body and protrusions into said base plate opening and said notches respectively and upon subsequent rotation of said bearing body relative to said base plate until said securing means is engaged, whereby said bearing body is secured to said base plate as the latter is engaged between said protrusions and said flange.

2. A bearing according to claim 1 wherein said securing means includes projections on said protrusions and extending towards said flange, said securing means further including depressions in said base plate in which said projections are received.

3. A bearing according to claim 2 wherein said protrusions and said flange are constructed and arranged such that said base plate is resiliently pressed between said protrusions and said flange when said bearing body is in assembled state on said base plate.

4. A bearing according to claim 1 wherein said bearing body is provided with means adapted to be engaged by a tool to facilitate rotatiton of said bearing body into its assembled state.

5. A bearing according to claim 3 wherein said depressions in said base plate are generally V-shaped.

6. A bearing according to claim 2 wherein said projections have a generally arcuate configuration.

7. A bearing according to claim 1 wherein said bearing body is made of synthetic resin.

8. A bearing according to claim 4 wherein said means adapted to be engaged by a tool includes a nut-like portion adapted to be engaged by a wrench and a slot portion adapted to be engaged by a screw driver.

* * * * *